(12) United States Patent
Schrader (10) Patent No.: US 9,695,921 B1
(45) Date of Patent: Jul. 4, 2017

(54) BLADE FOR AN IMPELLER OR A TURBINE FOR A TORQUE CONVERTER, A TORQUE CONVERTER AND METHOD OF PRODUCING THE SAME

(71) Applicant: Schaeffler Technologies AG & Co. KG, Herzogenaurach (DE)

(72) Inventor: Scott Schrader, Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/978,022

(22) Filed: Dec. 22, 2015

(51) Int. Cl.
*F16D 33/20* (2006.01)
*F16H 41/26* (2006.01)
*F16H 41/28* (2006.01)

(52) U.S. Cl.
CPC ............. *F16H 41/26* (2013.01); *F16D 33/20* (2013.01); *F16H 41/28* (2013.01)

(58) Field of Classification Search
CPC ........... F16D 33/20; F16H 41/26; F16H 41/28
USPC .......................................................... 60/367
See application file for complete search history.

(56) References Cited

U.S. PATENT DOCUMENTS

| | | | |
|---|---|---|---|
| 2,660,957 A * | 12/1953 | Koskinen | F16H 41/28 60/367 |
| 3,545,883 A | 12/1970 | Iijima | |
| 5,065,509 A * | 11/1991 | Sahashi | F16H 41/28 60/330 |
| 5,109,604 A | 5/1992 | Koebele | |

* cited by examiner

*Primary Examiner* — Michael Leslie
(74) *Attorney, Agent, or Firm* — Simpson & Simpson, PLLC (57) ABSTRACT

A torque converter including an axis of rotation; a cover arranged to receive torque; an impeller including an impeller shell non-rotatably connected to the cover; a turbine in fluid communication with the impeller, the turbine having a turbine shell; a core ring; and, at least one blade connected to the impeller shell or the turbine shell, each blade including: a respective first edge; a respective tab: extending from the respective first edge and through the core ring; and, fixing each blade to the core ring; and, a respective first extension: extending from the respective first edge in a first circumferential direction; and, in contact with the core ring. A method of fabricating an impeller or a turbine for a torque converter using a fixture and the at least one blade described above.

18 Claims, 14 Drawing Sheets

BLADE FOR AN IMPELLER OR A TURBINE FOR A TORQUE CONVERTER, A TORQUE CONVERTER AND METHOD OF PRODUCING THE SAME

TECHNICAL FIELD

The present disclosure relates generally to a torque converter impeller or a torque converter turbine having blades with extensions for maintaining alignment of the blades during fabrication of the impeller or the turbine. The present disclosure also relates to a method of fabricating the torque converter described above.

BACKGROUND

U.S. Pat. No. 5,109,604 (Koebele) discloses a prior art torque converter impeller which is assembled by placing vanes (blades) in a fixture to hold the vanes in a desired orientation. When the vanes are in position in the fixture, a core ring is positioned on notches in the vanes such that tabs in the vanes extend through slots in the core ring. The tabs are then bent rolled to secure the vanes to the core ring in a proper orientation. The core ring and vanes can then be assembled with the impeller outer shell. However, movement of the vanes within the fixture during the rolling operation results in misalignment of the vanes and the core ring.

SUMMARY

According to aspects illustrated herein, there is provided a blade for an impeller or a turbine for a torque converter including a body portion including: a first edge arranged to contact a shell for the impeller or the turbine; and, a second edge arranged to contact a core ring; a first extension extending from the second edge in a first direction; a second extension extending from the second edge in a second direction, opposite the first direction; and a tab extending from the second edge in a third direction, different from the first and second directions.

According to aspects illustrated herein, there is provided a torque converter including an axis of rotation; a cover arranged to receive torque; an impeller including an impeller shell non-rotatably connected to the cover; a turbine in fluid communication with the impeller, the turbine having a turbine shell; a core ring; and, at least one blade connected to the impeller shell or the turbine shell, each blade including: a respective first edge; a respective tab: extending from the respective first edge and through the core ring; and, fixing said each blade to the core ring; and a respective first extension: extending from the respective first edge in a first circumferential direction; and, in contact with the core ring.

According to aspects illustrated herein, there is provided a method of fabricating an impeller or a turbine for a torque converter, including the steps of: inserting a plurality of blades into respective channels in a fixture; passing a respective tab for each blade through a respective slot in a core ring; contacting the core ring with respective first and second circumferentially extending extensions for each blade; and bending the respective tabs to fix the plurality of blades to the core ring.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure. By "non-rotatably connected" components we mean that a first component is connected to a second component so that anytime the first component rotates, the second component rotates with the first component, and anytime the second component rotates, the first component rotates with the second component. Axial displacement between the first and second component is possible.

Figure 1:
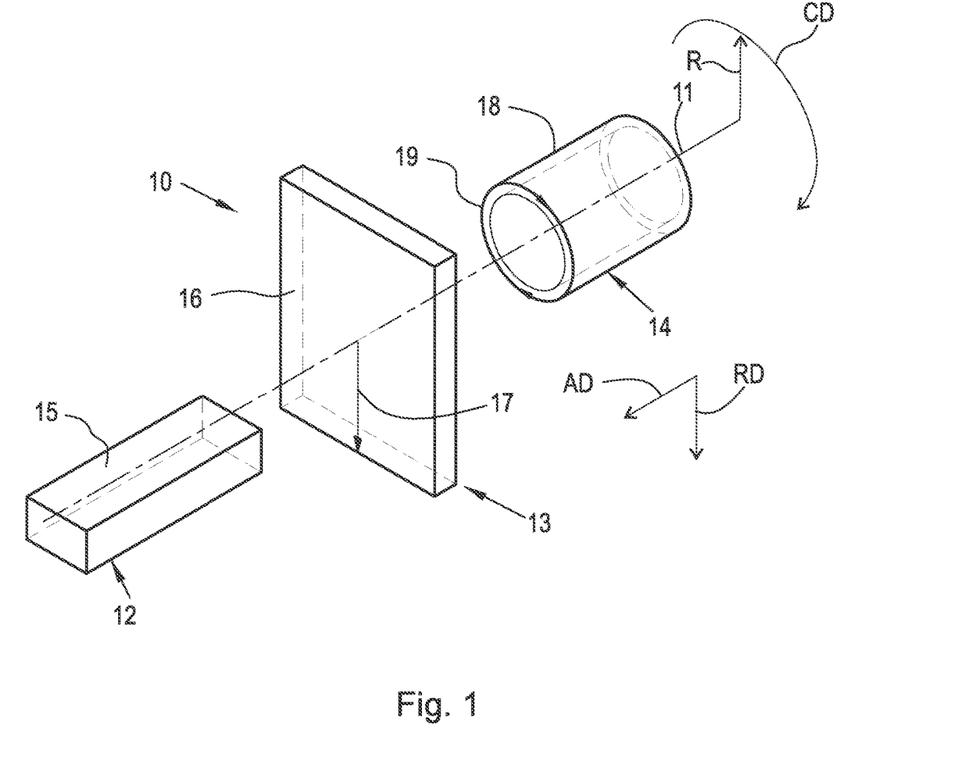
FIG. 1 is a perspective view of a cylindrical coordinate system demonstrating spatial terminology.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15 however, it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

Figure 2:
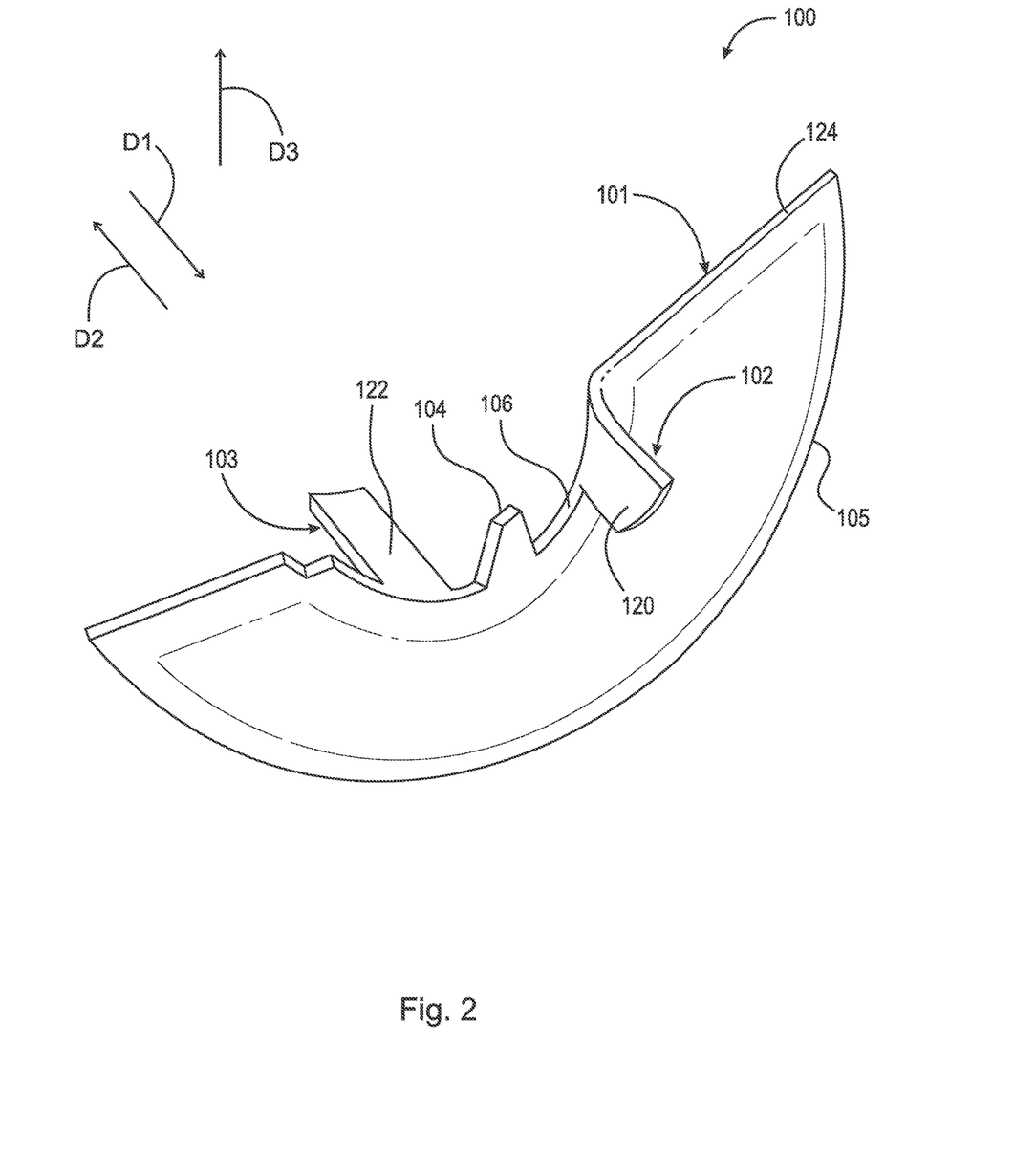
FIG. 2 is a perspective view of a blade for an impeller or a turbine for a torque converter.

FIG. 2 is a perspective view of blade 100 for an impeller or a turbine for a torque converter.

Figure 3:
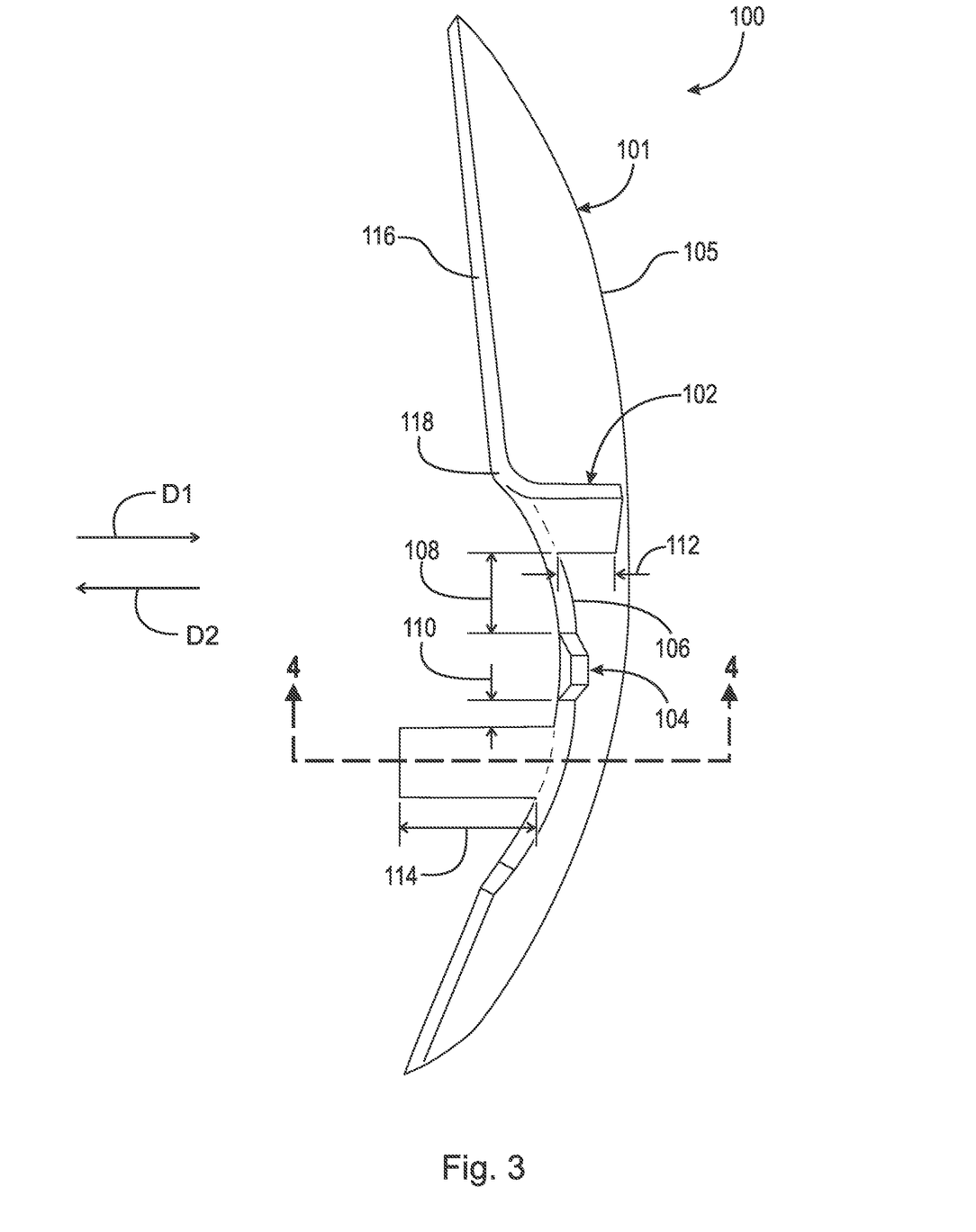
FIG. 3 is a top down view of the blade of FIG. 2.

FIG. 3 is a top down view of blade 100 of FIG. 2.

Figure 4:
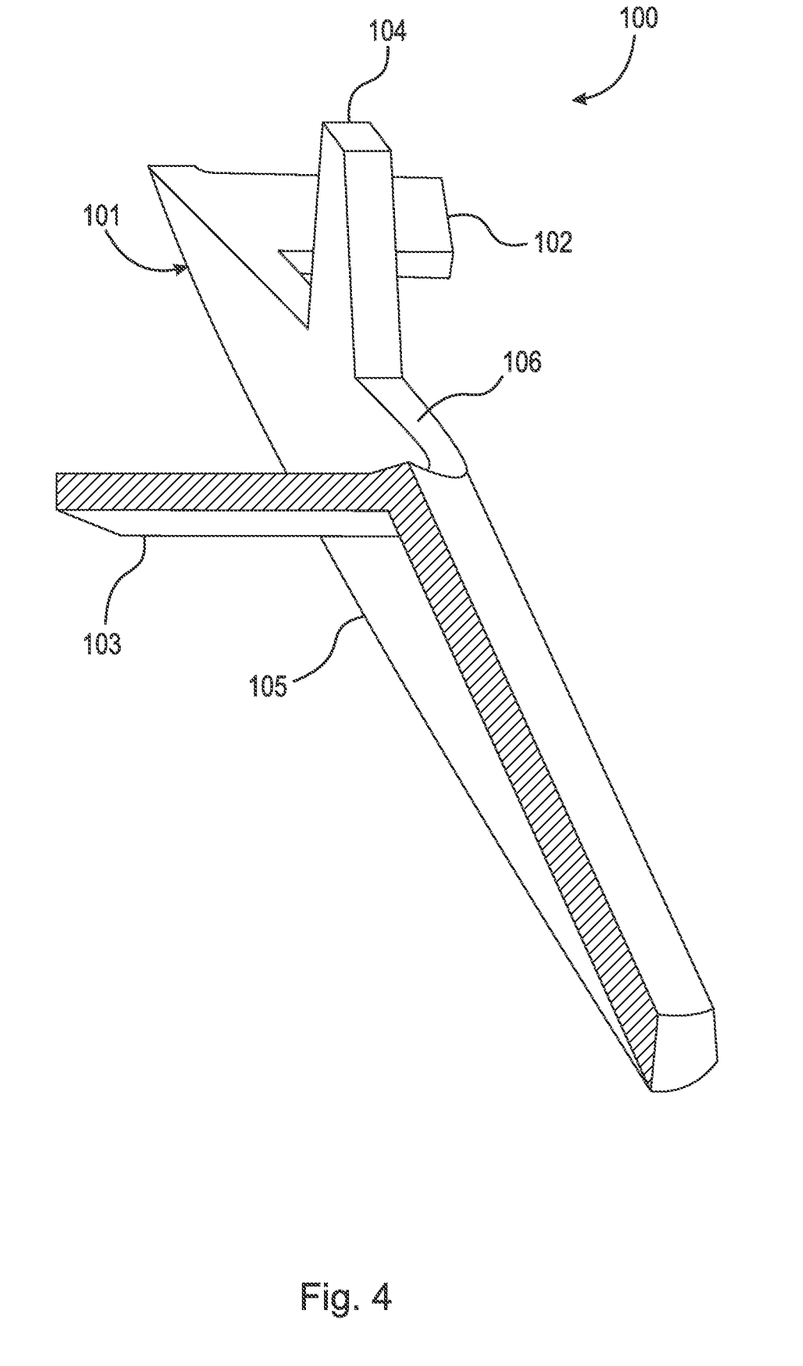
FIG. 4 is a cross-sectional view taken generally along line 4-4 in FIG. 3.

FIG. 4 is a cross-sectional view taken generally along line 4-4 in FIG. 3. The following should be viewed in light of FIGS. 2 through 4. Blade 100 includes body portion 101, extension 102, extension 103 and tab 104. Body portion 101 includes edges 105 and 106. Edge 105 is arranged to contact a shell (shown below) for a turbine or an impeller for a torque converter. Edge 106 is arranged to contact a core ring (shown below) for the torque converter. Extension 102 extends from edge 106 in direction D1. Extension 103 extends from edge 106 in direction D2, opposite direction D1. Tab 104 extends from edge 106 in direction D3, different from directions D1 and D2. In an example embodiment, direction D3 is not orthogonal to directions D1 or D2.

Tab 104 is positioned between extensions 102 and 103 along edge 106. In an example embodiment, extension 102 is located distance 108 from tab 104 along edge 106 and extension 103 is located distance 110, different from distance 108, from tab 104 along edge 106. In an example embodiment, distance 110 is smaller than distance 108. In an example embodiment, distances 108 and 110 are substantially equal. In an example embodiment, extension 102 extends distance 112 from edge 106 in direction D1 and extension 103 extends distance 114 from edge 106 in direction D2. In an example embodiment, distances 112 and 114 are different. In an example embodiment, distance 114 is greater than distance 112. In an example embodiment, distances 112 and 114 are substantially equal.

Edge 116 connects edges 105 and 106. In an example embodiment, at least a portion of extension 102 extends from junction 118 of edges 106 and 116.

Figure 5:
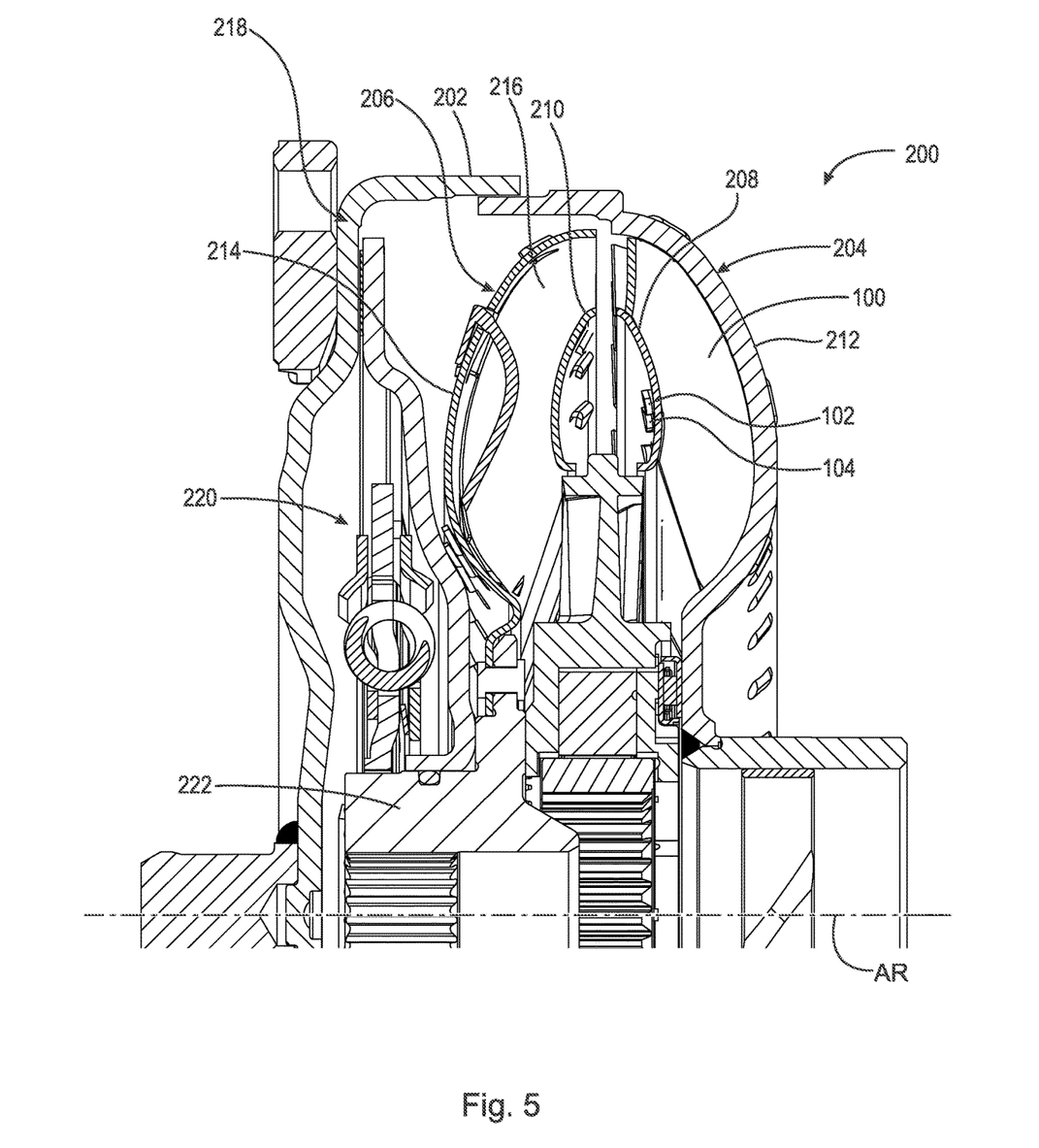
FIG. 5 is a partial cross-sectional view of a torque converter including the blade of FIG. 2.

FIG. 5 is a partial cross-sectional view of torque converter 200 including blade 100 of FIG. 2. Torque converter 200 includes axis of rotation AR, cover 202, impeller 204, turbine 206, and core rings 208 and 210. In the example of FIG. 5, impeller 204 includes impeller shell 212 and at least one impeller blade 100. Turbine 206 includes turbine shell 214 and at least one turbine blade 216. It should be understood that turbine 206 can include blade 100 and that both impeller 204 and turbine 206 can include blades 100. Cover 202 is arranged to receive torque. Turbine 206 is in fluid communication with impeller 204. In an example embodiment, torque converter 200 includes torque converter clutch 218, torsional vibration damper 220, and output hub 222 arranged to connect to an input shaft (not shown) for a transmission.

Figure 6:
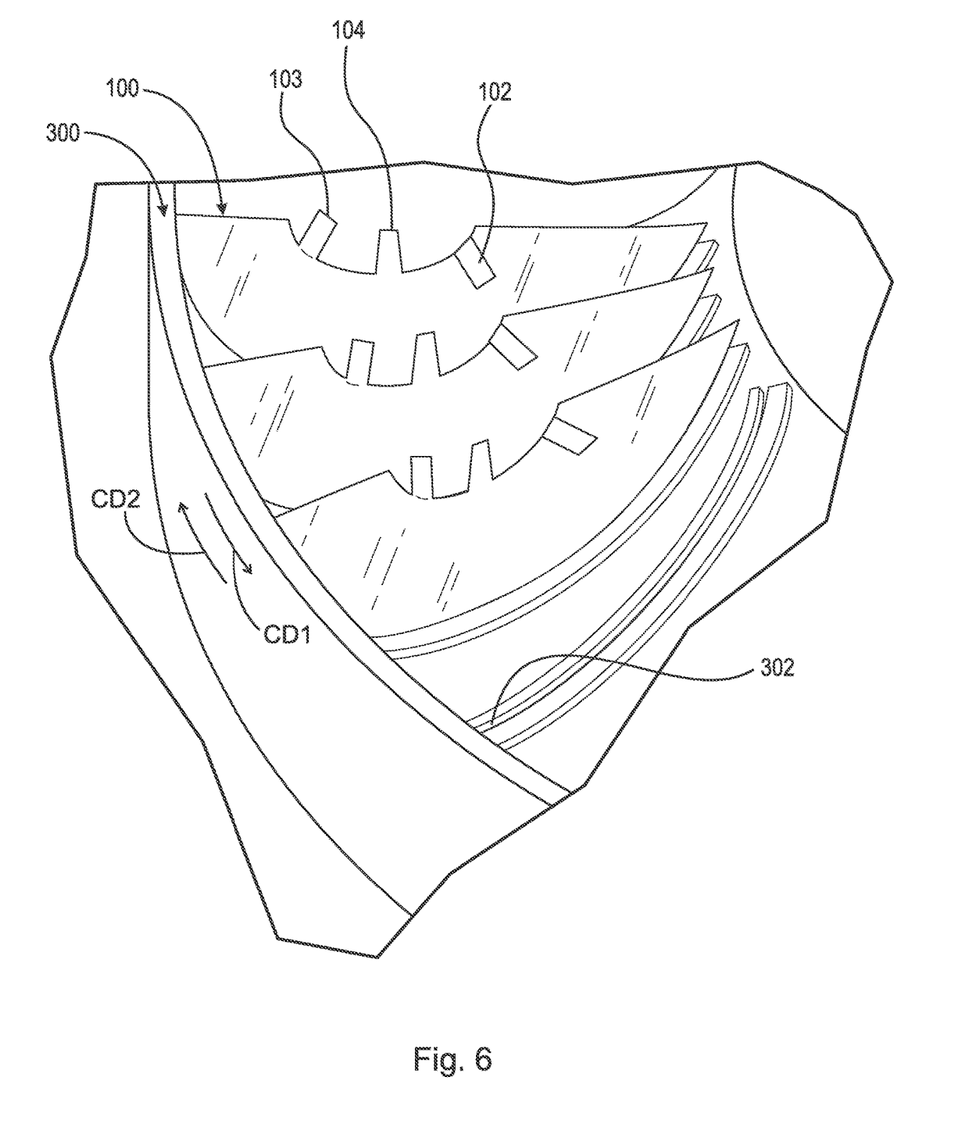
FIG. 6 shows a plurality of blades, shown in FIG. 2, in a fixture.

FIG. 6 shows a plurality of blades, shown in FIG. 2, in fixture 300. The following describes a method of fabricating an impeller or a turbine for a torque converter. Although the method is presented as a sequence of steps for clarity, no order should be inferred from the sequence unless explicitly stated. To simplify the presentation, only three blades are shown in FIG. 6; however, it should be understood that in general, each blade 100 for an impeller or turbine is installed in a respective groove 302 in fixture 300, and a respective groove 302 is provided for each blade 100 for an impeller or turbine. In the example that follows, fixture 300 is used to assemble blades 100 on a core ring analogous to core ring 208 in FIG. 5. However, it should be understood that fixture 300 can be used to assemble blades 100 with other configurations of core rings. A first step involves inserting a plurality of blades 100 into respective groove 302 in fixture 300. That is, each blade 100 is installed in a respective groove 302. For example, respective edges 105 are inserted in respective grooves 302. Grooves 302 block movement of edges 105 in circumferential directions CD1 and CD2.

Figure 7:
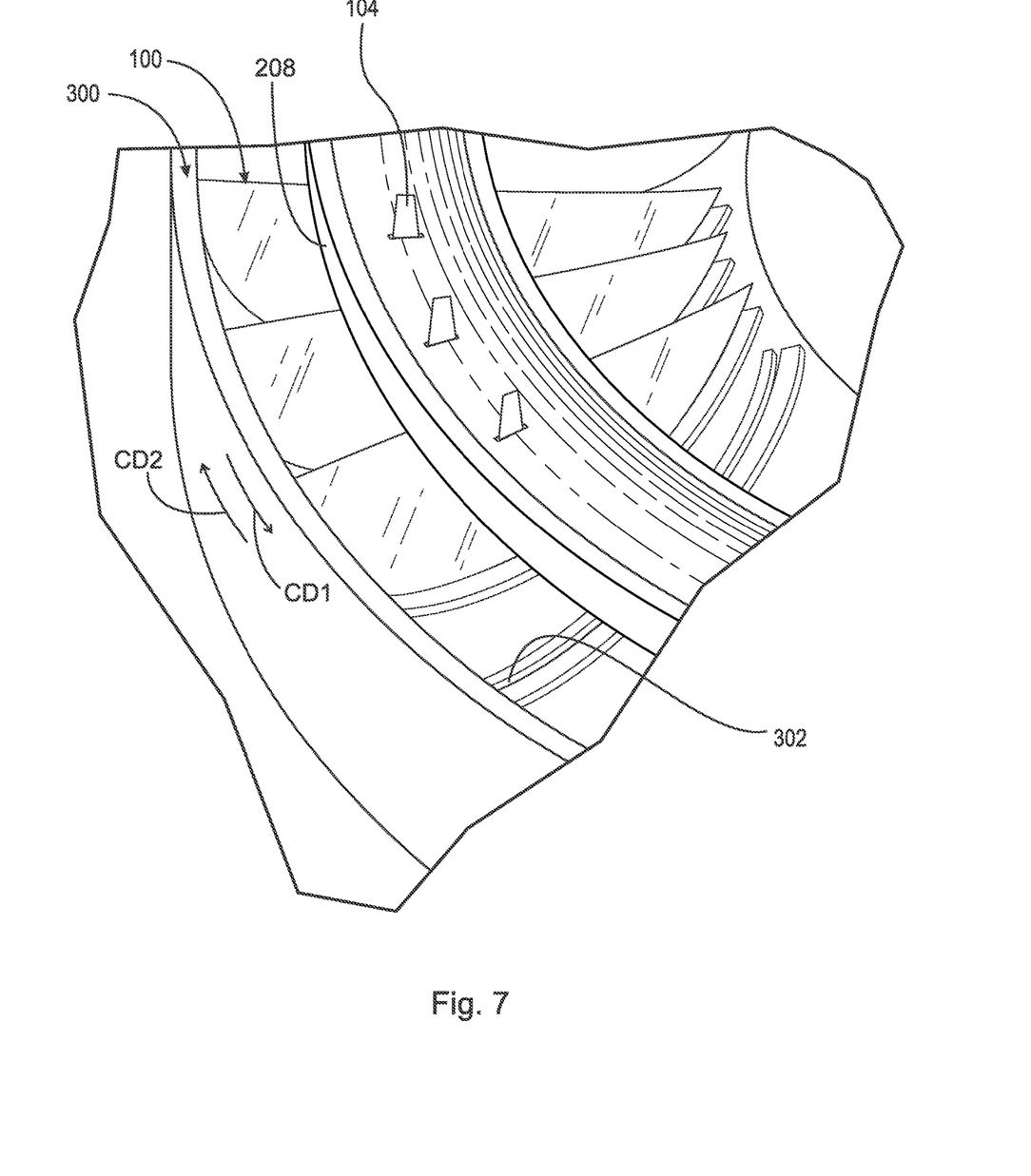
FIG. 7 adds a core ring to FIG. 6.

FIG. 7 adds core ring 208 to FIG. 6.

Figure 8:
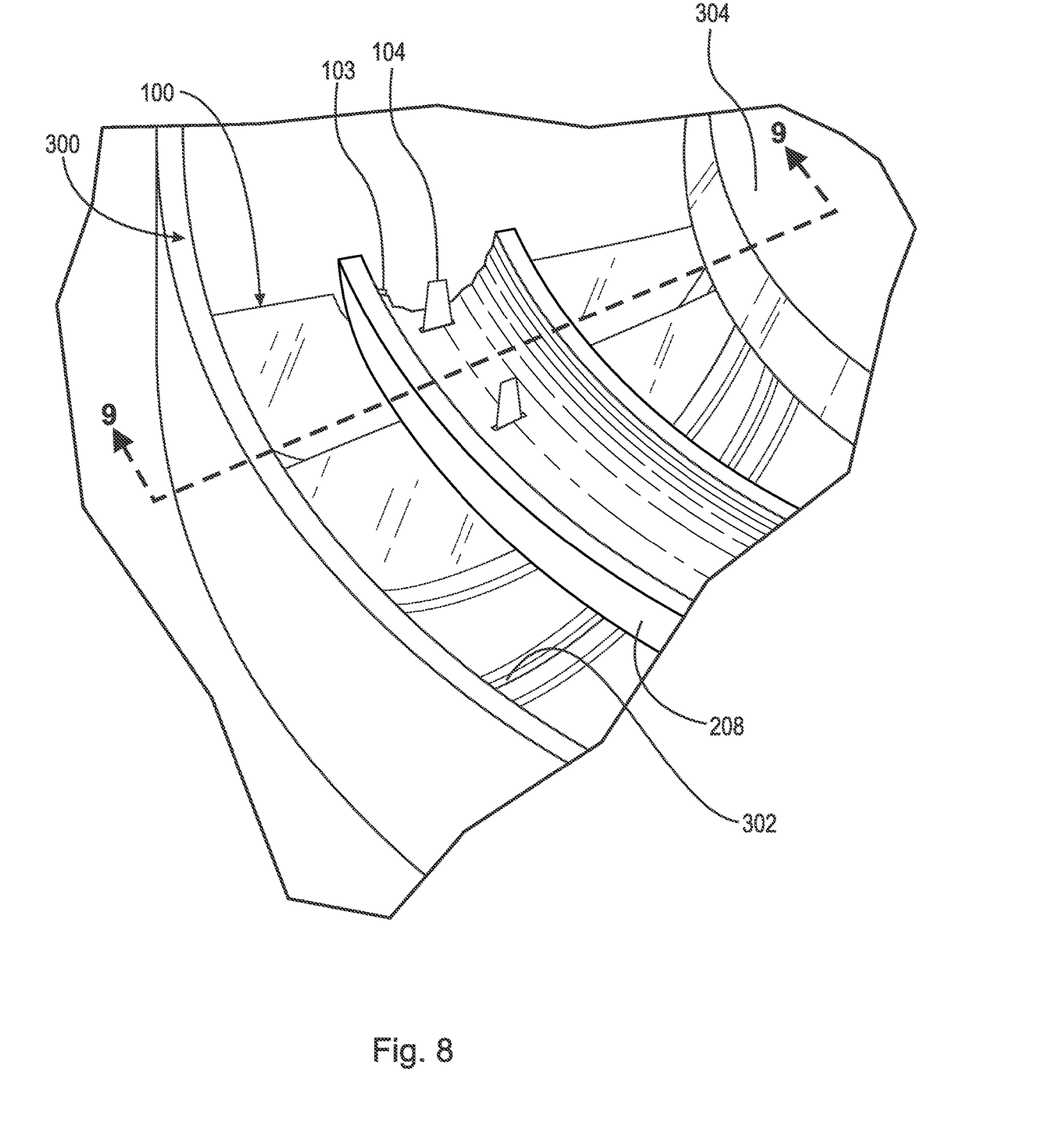
FIG. 8 adds a retention ring to FIG. 7.

FIG. 8 adds retention ring 304 to FIG. 7.

Figure 9:
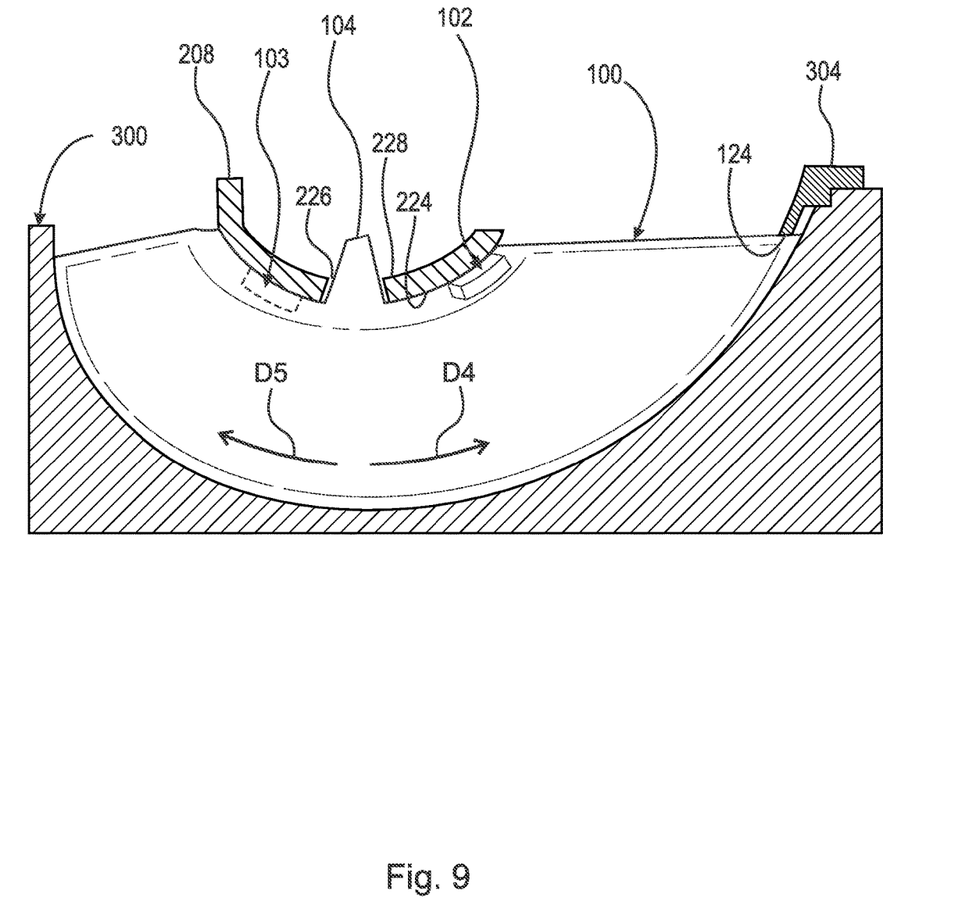
FIG. 9 is a partial cross-sectional view taken generally along line 9-9 in FIG. 8.

FIG. 9 is a partial cross-sectional view taken generally along line 9-9 in FIG. 8. The following should be viewed in light of FIGS. 2 through 9. A second step involves installing core ring 208 over blades 100 and contacting core ring 208 with extensions 102 and 103. For example, surfaces 120 and 122 (shown in FIG. 2) of extensions 102 and 103, respectively, contact surface 224 of core ring 208. Surfaces 120 and 122 are curved to mirror the curvature of surface 224 of core ring 208. Tabs 104 pass through openings 226 in core ring 208. Tabs 104 extend partially in a radial direction and partially in an axial direction. A third step involves installing retention ring 304 over respective radially innermost portions 124 of blades 100. Ring 304 blocks movement of blades 100 in direction D4, restrains movement of blades 100 in direction D5, and fixes respective positions of blades 100 in fixture 300.

Figure 10:
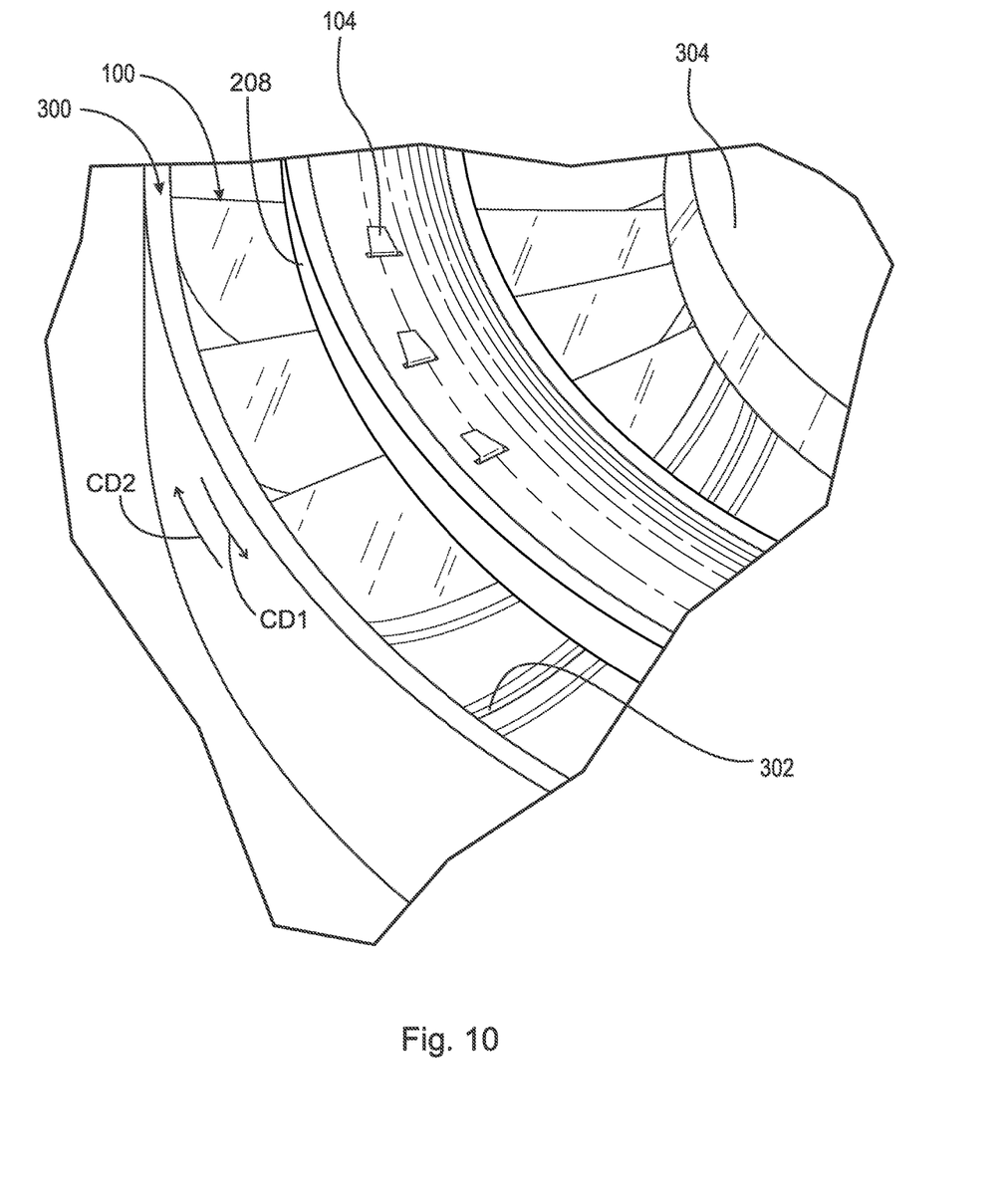
FIG. 10 shows tabs bent over.

FIG. 10 shows tabs 104 bent with respect to position shown in FIG. 9. A fourth step involves bending tabs 104 over onto surface 228 of core ring 208 using any means known in the art. In an example embodiment, when bent, each tab 104 includes a portion that extends in circumferential direction CD2. In an example embodiment, each tab 104, when bent, includes a portion that extends in circumferential direction CD1. A fifth step involves securing blades 100 and core ring 208 to impeller shell 212.

Figure 11:
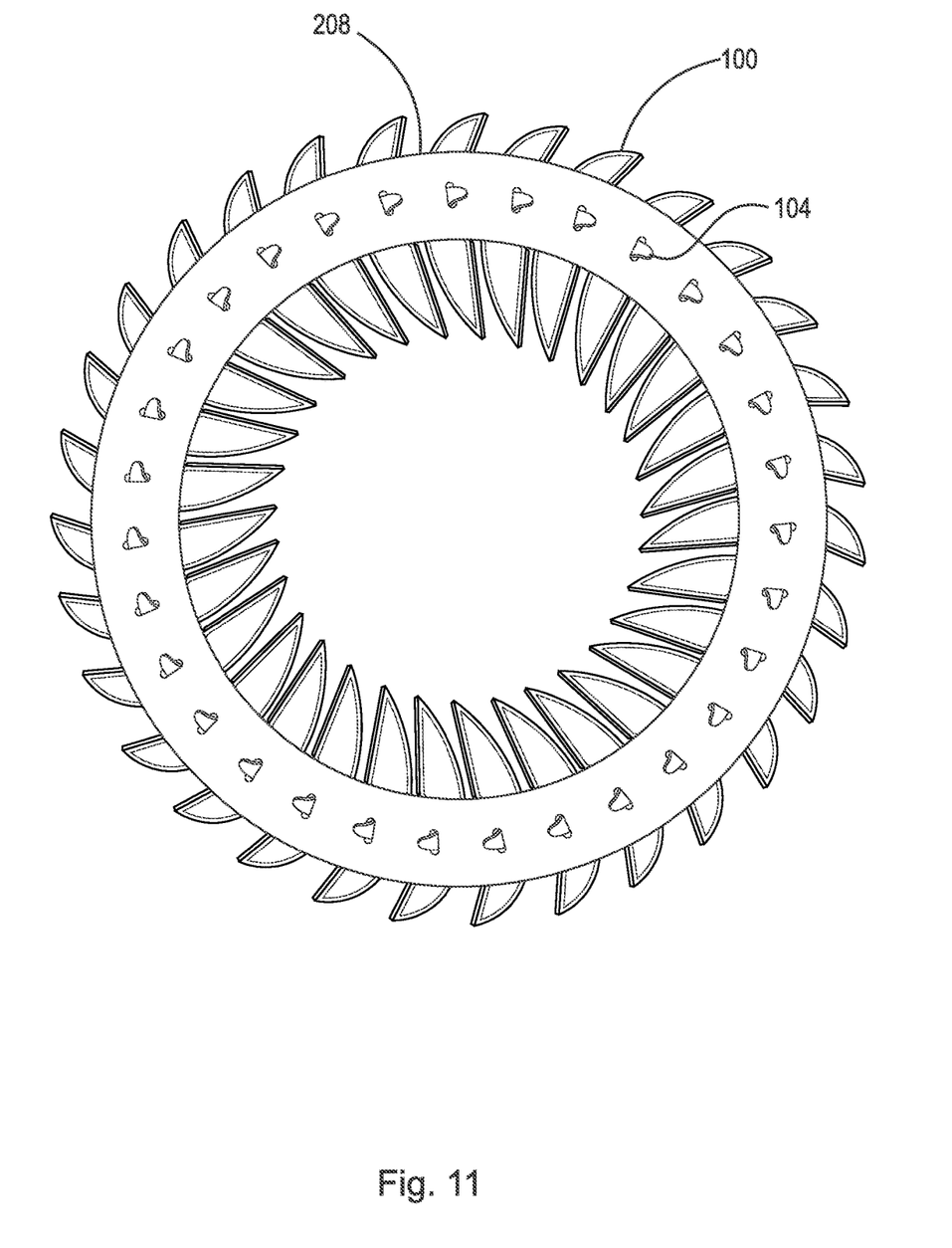
FIG. 11 is a top view of the blades of FIG. 2 installed on a core ring.

FIG. 11 is a top view of blades 100 installed on core ring 208.

Figure 12:
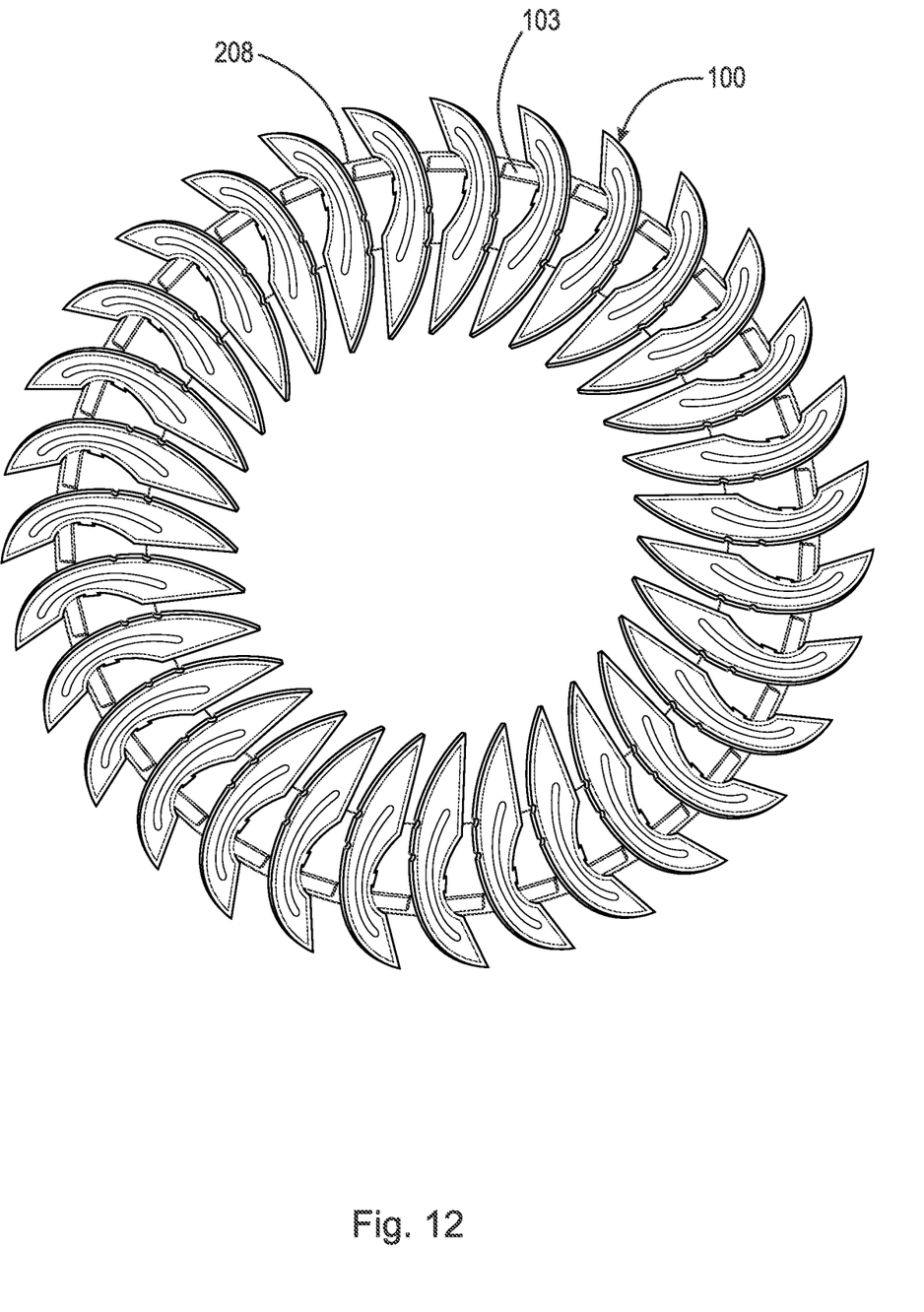
FIG. 12 is bottom view of the blades of FIG. 2 installed on a core ring.

FIG. 12 is bottom view of blades 100 installed on core ring 208.

Figure 13:
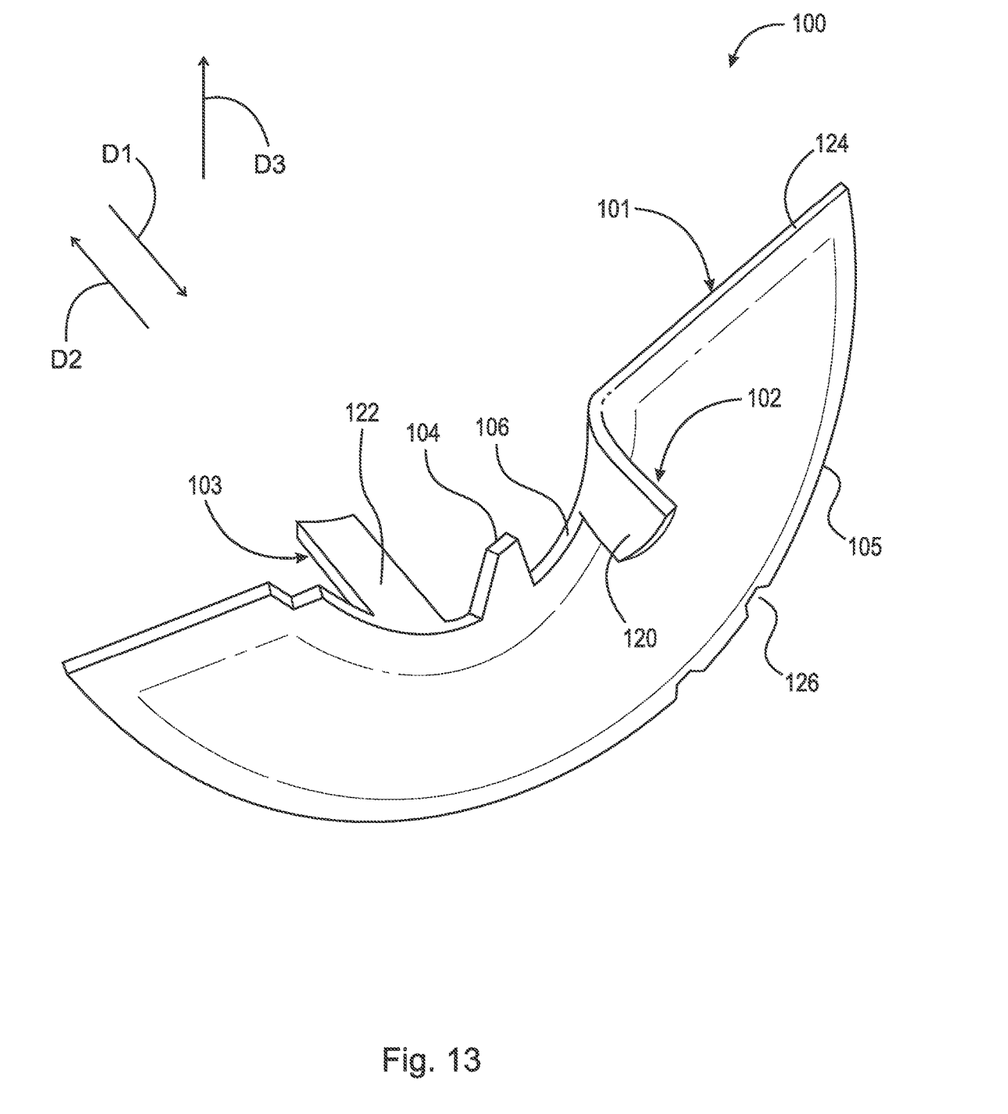
FIG. 13 is a perspective view of a blade, for an impeller or a turbine for a torque converter, including a notch; and, FIG. 14 shows a plurality of blades, shown in FIG. 13, in a fixture.

FIG. 13 is a perspective view of blade 100, for an impeller or a turbine for a torque converter, including notch 126.

Figure 14:
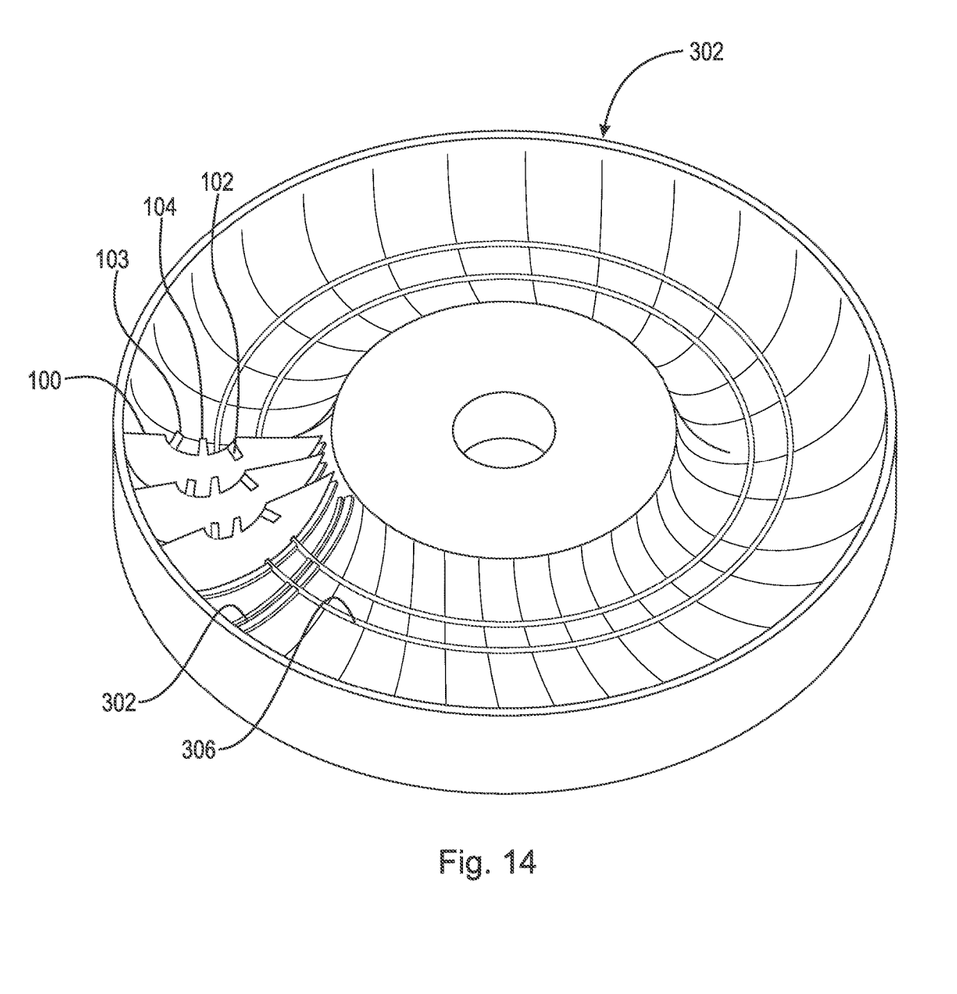

FIG. 14 shows a plurality of blades, shown in FIG. 13, and in fixture 300. In an example embodiment, blades 100 includes at least one notch 126 in edge 105. In an example embodiment, fixture 300 includes at least one rib 306. When blades 100 with notches 126 are installed in fixture 300, notches 126 fit over ribs 306 to block movement of blades 100 in directions D4 and D5 (shown in FIG. 9). In an example embodiment, retention ring 304 is not used with fixture 300 when fixture 300 includes ribs 306.

Advantageously, blades 100 and a method using fixture 300 resolves the problem noted above, namely, displacement of blades for an impeller or a turbine while the blades are being secured to a core ring. Specifically, extensions 102 and 103 cradle a core ring, such as core ring 208, urging the core ring and blades into proper alignment. Retention ring 304 and/or notches 126 and ribs 306 prevent blades 100 from slipping in direction D4 and D5. Further, extensions 102 and 103 provide stabilizing surfaces during rolling operations bending over tabs 104. For a known blade, only an edge in contact with the core ring opposes the force from the rolling operation.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A blade for an impeller or a turbine for a torque converter, comprising:
   a body portion including:
      a first edge arranged to contact a shell for the impeller or the turbine; and,
      a second edge arranged to contact a core ring;
   a first extension extending from the second edge in a first direction;
   a second extension extending from the second edge in a second direction, opposite the first direction; and,
   a tab extending from the second edge in a third direction, different from the first and second directions.

2. The blade recited in claim 1, wherein the third direction is not orthogonal to the first or second directions.

3. The blade recited in claim 1, wherein the tab is positioned between the first and second extensions along the second edge.

4. The blade recited in claim 1,
   wherein the first extension is located a first distance from the tab along the second edge and the second extension is located a second distance from the tab along the second edge; and,
   wherein:
      the first distance is different from the second distance; or,
      the first and second distances are equal.

5. The blade recited in claim 1, further comprising:
   a third edge connecting the first and second edges, wherein:
   at least a portion of the first extension extends from a junction of the second and third edges.

6. The blade recited in claim 1,
   wherein the first extension extends from the second edge a first distance in the first direction and the second extension extends from the second edge a second distance in the second direction; and,
   wherein:
      the first distance is different from the second distance; or,
      the first and second distances are equal.

7. The blade recited in claim 1, further comprising:
   a notch in the first edge.

8. A torque converter, comprising:
   an axis of rotation;
   a cover arranged to receive torque;
   an impeller including an impeller shell non-rotatably connected to the cover;
   a turbine in fluid communication with the impeller, the turbine having a turbine shell;
   a core ring; and,
   at least one blade connected to the impeller shell or the turbine shell, each blade including:
      a respective first edge;
      a respective tab:
         extending from the respective first edge and through the core ring; and,
         fixing said each blade to the core ring;
      a respective first extension:
         extending from the respective first edge in a first circumferential direction; and,
         in contact with the core ring; and,
      a respective second extension:
         extending from the respective first edge in a second circumferential direction, opposite the first circumferential direction; and,
         in contact with the core ring.

9. The torque converter recited in claim 8, wherein:
   the respective first edge contacts the core ring; and,
   said each blade includes a respective second edge in contact with the turbine shell or the impeller shell.

10. The torque converter recited in claim 9, wherein said each blade includes a notch along the second edge.

11. The torque converter recited in claim 8, wherein:
    the respective tab includes a portion extending from the first respective edge and past the core ring; and,
    the portion extends in the first circumferential direction or the second circumferential direction.

12. The torque converter recited in claim 8, wherein the respective tab extends partially in a radial direction and partially in an axial direction.

13. The torque converter recited in claim 8, wherein the respective tab is positioned between the respective first extension and the respective second extension along the respective first edge.

14. A method of fabricating an impeller or a turbine for a torque converter, comprising the steps of:
    inserting a plurality of blades into respective channels in a fixture;
    passing a respective tab for each blade through a respective slot in a core ring;
    contacting the core ring with respective first and second circumferentially extending extensions for said each blade;
    placing a retention ring over a radially innermost portion of the plurality of blades; and,
    bending the respective tabs to fix the plurality of blades to the core ring.

15. The method recited in claim 14, wherein contacting the core ring with the respective first and second circumferentially extending extensions for said each blade and placing a retention ring over a radially innermost portion of the plurality of blades includes fixing a position of said each blade within the fixture.

16. The method recited in claim 14, wherein:
    inserting the plurality of blades into respective channels in the fixture includes engaging a respective notch for said each blade with a rib in the fixture.

17. The method recited in claim 14, wherein:
    contacting the core ring with the respective first and second circumferentially extending extensions for said each blade includes contacting a first surface of the core ring; and,
    bending the respective tabs to fix the plurality of blades to the core ring includes bending the respective tabs against a second surface, different from the first surface, of the core ring.

18. The method recited in claim 14, further comprising:
    securing the core ring and the plurality of blades to an impeller shell or a turbine shell of the torque converter.

* * * * *